(12) United States Patent
Lafontaine

(10) Patent No.: US 7,135,981 B1
(45) Date of Patent: Nov. 14, 2006

(54) FUEL LEVEL VARIATION DETECTOR FOR MARINE VEHICLE

(75) Inventor: Yvan Lafontaine, Grand-Mère (CA)

(73) Assignee: Teleflex Megatech Inc., Quebec (CA)

( * ) Notice: Subject to any disclaimer, the term of this patent is extended or adjusted under 35 U.S.C. 154(b) by 213 days.

(21) Appl. No.: 10/961,227

(22) Filed: Oct. 12, 2004

(51) Int. Cl.
G08B 21/00 (2006.01)

(52) U.S. Cl. ............ 340/618; 340/616; 340/620; 340/450.2; 340/623; 73/290 R; 73/304 R; 73/49.7

(58) Field of Classification Search ........... 340/618, 340/616, 620, 450.2, 623; 73/290 R, 304 R, 73/49.7
See application file for complete search history.

(56) References Cited

U.S. PATENT DOCUMENTS

| | | | |
|---|---|---|---|
| 3,652,868 A | 3/1972 | Hunt | |
| 3,789,231 A | 1/1974 | Hayden | |
| 3,857,359 A | 12/1974 | Ward et al. | |
| 4,405,924 A | 9/1983 | Shinoda | |
| 4,438,425 A | 3/1984 | Tsuchida et al. | |
| 4,456,903 A | 6/1984 | Kishi et al. | |
| 4,514,645 A | 4/1985 | Endo et al. | |
| 4,604,912 A | 8/1986 | Sugita et al. | |
| 4,609,904 A | 9/1986 | Paine | |
| 4,628,310 A | 12/1986 | Reighard et al. | |
| 4,638,131 A | 1/1987 | Kidd | |
| 4,672,214 A | 6/1987 | Takahashi | |
| 4,678,906 A | 7/1987 | Rudi et al. | |
| 4,737,761 A | 4/1988 | Dosjoub et al. | |
| 4,757,213 A | 7/1988 | Tigges et al. | |
| 4,766,326 A | 8/1988 | Hayashi et al. | |
| 4,772,799 A | 9/1988 | Inui | |
| 4,792,783 A | 12/1988 | Burgess | |
| 4,792,965 A | 12/1988 | Morgan | |
| 4,835,512 A | 5/1989 | Bratton | |
| 4,855,144 A | 8/1989 | Leong et al. | |
| 4,879,476 A | 11/1989 | Schweizer | |
| 4,912,646 A * | 3/1990 | Cerruti | 702/55 |
| 4,944,241 A | 7/1990 | Carter | |
| 4,962,495 A | 10/1990 | Gibbons | |
| 5,003,906 A | 4/1991 | Sova | |
| 5,041,817 A | 8/1991 | Reeb | |
| 5,049,082 A | 9/1991 | Carter | |
| 5,132,665 A | 7/1992 | Hutchisson et al. | |
| 5,337,694 A | 8/1994 | Nix | |
| 5,498,911 A | 3/1996 | Bossler et al. | |
| 5,506,564 A * | 4/1996 | Hargest | 340/450.2 |

(Continued)

FOREIGN PATENT DOCUMENTS

CA 2071681 12/1992

(Continued)

Primary Examiner—Tai T. Nguyen
(74) Attorney, Agent, or Firm—Baker & Hostetler LLP (57) ABSTRACT

A signaling device for a marine vehicle having a fuel tank, a fuel level value detected in the fuel tank, and a blower to evacuate fuel fumes. The signaling device comprises: a fuel level variation detector; a refueling detector for detecting a fuel level variation corresponding to a refueling event; a refueling signal generator for generating a refueling signal when the refueling event is detected; and a refueling activator for activating the blower, and/or an indicator of refueling for the user, using the refueling signal. A signaling method for the marine vehicle comprising: detecting a variation of the fuel level value over time; detecting a fuel level increase in the variation to correspond to a refueling event; generating a refueling signal when the refueling event is detected; and activating the blower, and/or an indicator of refueling for the user, using the refueling signal.

16 Claims, 10 Drawing Sheets

U.S. PATENT DOCUMENTS

| | | | |
|---|---|---|---|
| 5,515,399 | A | 5/1996 | Swart |
| 5,532,673 | A * | 7/1996 | Olson et al. ............. 340/450.2 |
| 5,585,785 | A | 12/1996 | Gwin et al. |
| 5,666,102 | A | 9/1997 | Lahiff |
| 5,707,262 | A | 1/1998 | Huntley et al. |
| 5,719,824 | A | 2/1998 | Boucher |
| 5,724,907 | A | 3/1998 | Castellucci |
| 5,787,833 | A | 8/1998 | Lewis |
| 5,810,606 | A | 9/1998 | Ballast et al. |
| 5,833,025 | A | 11/1998 | Bhandari |
| 5,855,144 | A | 1/1999 | Parada |
| 5,856,710 | A | 1/1999 | Baughman et al. |
| 5,945,744 | A | 8/1999 | Dobler et al. |
| 5,994,788 | A | 11/1999 | Dobler et al. |
| 6,012,736 | A | 1/2000 | Hansen |
| 6,054,778 | A | 4/2000 | Downs |
| 6,078,252 | A | 6/2000 | Kulczycki et al. |
| 6,091,779 | A | 7/2000 | Griessbach |
| 6,114,949 | A | 9/2000 | Schmitz et al. |
| 6,121,692 | A | 9/2000 | Michaels et al. |
| 6,169,339 | B1 | 1/2001 | Cripe |
| 6,232,871 | B1 | 5/2001 | Spiess |
| 6,253,131 | B1 | 6/2001 | Quigley et al. |
| 6,262,513 | B1 | 7/2001 | Furukawa et al. |
| 6,264,513 | B1 | 7/2001 | Marsh |
| 6,271,741 | B1 | 8/2001 | Sajna |
| 6,292,069 | B1 | 9/2001 | Michaels et al. |
| 6,343,670 | B1 | 2/2002 | Mindl et al. |
| 6,388,548 | B1 | 5/2002 | Saito et al. |
| 6,501,361 | B1 | 12/2002 | Michaels et al. |
| 6,554,303 | B1 | 4/2003 | Benz et al. |
| 6,670,722 | B1 | 12/2003 | Kessell et al. |
| 6,925,855 | B1 * | 8/2005 | De Ronne et al. ........... 73/49.7 |
| 2002/0041074 | A1 | 4/2002 | Benz et al. |
| 2002/0125061 | A1 | 9/2002 | Kawamura |
| 2002/0171522 | A1 | 11/2002 | Kazmierczak |
| 2003/0150366 | A1 | 8/2003 | Kaufmann et al. |
| 2003/0179105 | A1 | 9/2003 | Kazmierczak |

FOREIGN PATENT DOCUMENTS

| | | |
|---|---|---|
| CA | 2073845 | 2/1993 |
| CA | 2317346 | 3/2001 |
| CA | 2318596 | 3/2001 |
| DE | 69816429 | 4/2004 |
| EP | 0183580 A1 | 6/1986 |
| EP | 0451445 A2 | 10/1991 |
| EP | 0528463 A1 | 2/1993 |
| EP | 0680060 A1 | 11/1995 |
| EP | 0679554 B1 | 11/2002 |
| EP | 0969989 | 7/2003 |
| JP | 2001521463 | 11/2001 |
| WO | WO9712783 A2 | 4/1997 |

* cited by examiner

FIG-1 (PRIOR ART)

FIG_3

FUEL LEVEL VARIATION DETECTOR FOR MARINE VEHICLE

BACKGROUND OF THE INVENTION

1) Field of the Invention

The invention relates to the detection of fuel level variations in gas tanks. More particularly, the invention relates to activating a subsystem in response to the detection of a fuel level variation in a marine vehicle, like activating an indicator or a blower.

2) Description of the Prior Art

The fueling of marine vehicles usually generates a certain quantity of fumes which passengers may find disturbing. Fumes may also be dangerous in the advent of a spark which may occur during the operation of starting the marine vehicle motor. As a matter of fact, the American Boat & Yacht Council (ABYC) recommends running a blower for a period of four minutes prior to ignition, as per the US Code of Federal Regulations (CFR) (see the ABYC "Standards and Technical Information Reports for Small Crafts", sections H-2.5.5 and H-2.6.3, and the Code of Federal Regulations at CFR 183.610(f), last updated in 2000). Even though fumes may be present at any time, they are particularly abundant during the refueling operation.

To counter this problem, several systems have been proposed, such as using an air pressure sensor to detect the correct functioning of an engine compartment fan, the ignition being disabled for a predetermined delay during which proper ventilation occurs; using a pressure sensitive switch to activate and deactivate the bilge blower in two steps: when the marine vehicle is stopped or moving slowly, water flowing in the switch activates the blower, whereas when the marine vehicle increases its speed, it begins skimming at the surface of the water resulting in the water flowing out of the switch and deactivating the blower; using a speed sensor to stop ventilation when the vehicle speed reaches a predetermined speed; using a vapor detector signal either as a vapor indicator, an ignition disabling trigger, or a blower actuator; and using a circuitry in the gas tank cap which activates a blower when the cap is removed and deactivates the blower then the cap is replaced.

These systems all present different means to increase boating safety by offering different types of triggers for a blower, adapted to different situations.

SUMMARY OF THE INVENTION

An object of the invention is to provide means to detect a variation of fuel level in a gas tank of a marine vehicle due to refueling and/or fuel leakage.

A further object of the invention is to provide means to activate a blower to evacuate fuel fumes and/or to activate an indicator of fuel variation for a user once a fuel level increase due to refueling or a fuel level decrease due to a fuel tank leak is detected in a marine vehicle.

According to a broad aspect of the invention, a signaling device for a marine vehicle having a fuel tank, a fuel level value detected in the fuel tank, and a blower to evacuate fuel fumes. The signaling device comprises: a fuel level variation detector; a refueling detector for detecting a fuel level variation corresponding to a refueling event; a refueling signal generator for generating a refueling signal when the refueling event is detected; and a refueling activator for activating the blower, and/or an indicator of refueling for the user, using the refueling signal.

According to another broad aspect of the invention, a signaling method for the marine vehicle comprising: detecting a variation of the fuel level value over time; detecting a fuel level increase in the variation to correspond to a refueling event; generating a refueling signal when the refueling event is detected; and activating the blower, and/or an indicator of refueling for the user, using the refueling signal.

Another broad aspect of the invention is to provide a signaling device for a marine vehicle having a fuel tank, a fuel level value corresponding to a fuel level detected in the fuel tank, and a blower to evacuate fuel fumes. The signaling device comprises: a fuel level variation detector for detecting a variation of the fuel level value over time; a refueling detector for detecting a fuel level increase in the variation to correspond to a refueling event; a refueling signal generator for generating a refueling signal when the refueling event is detected; and a refueling activator for activating the blower, and/or an indicator of refueling for the user, using the refueling signal.

Another broad aspect of the invention is to provide a signaling method for a marine vehicle having a fuel tank, a fuel level value corresponding to a fuel level detected in the fuel tank, and a blower to evacuate fuel fumes. The signaling method comprises: detecting a variation of the fuel level value over time; detecting a fuel level increase in the variation to correspond to a refueling event; generating a refueling signal when the refueling event is detected; and activating the blower, and/or an indicator of refueling for the user, using the refueling signal.

BRIEF DESCRIPTION OF THE DRAWINGS

Further features and advantages of the present invention will become apparent from the following detailed description, taken in combination with the appended drawings, in which:

FIG. 8 comprises FIG. 8A, FIG. 8B and FIG. 8C which, when combined, form a flow chart representing the main steps of the preferred embodiment.

It will be noted that throughout the appended drawings, like features are identified by like reference numerals.

DETAILED DESCRIPTION OF THE PREFERRED EMBODIMENT

The present invention provides a signaling device and a method that detects a fuel level variation in a marine vehicle using the fuel sensor and consequently activates a blower and/or an indicator for the user. If the detected variation is positive, i.e. there is refueling taking place, the indicator will be a refueling indicator. If the detected variation is negative, i.e. there is a fuel leak, the indicator will be a fuel leakage indicator. In both cases, the noxious fumes can be evacuated by activation of a blower during and after the variation of fuel level for safety and comfort of the marine vehicle occupants.

Figure 1:
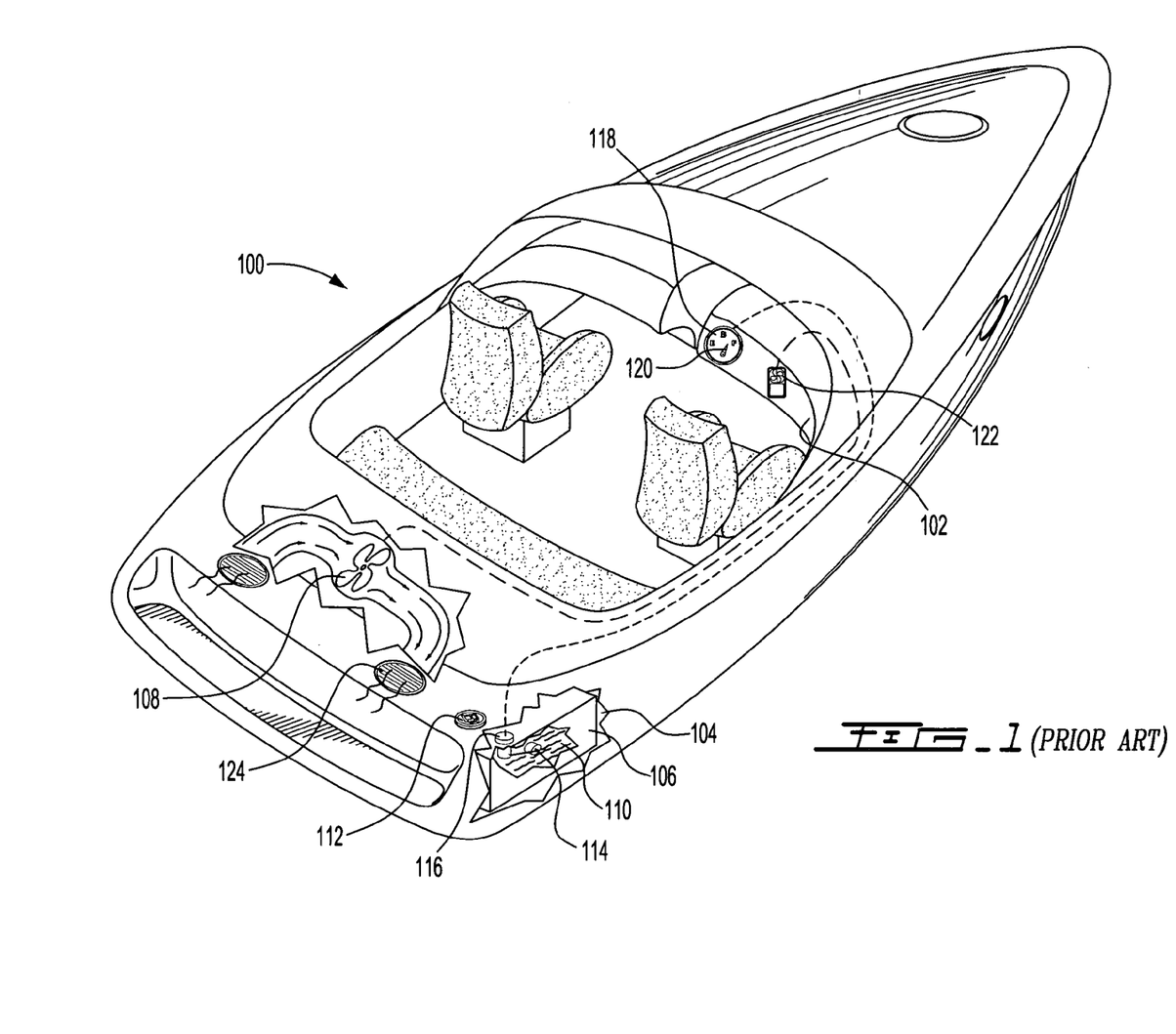
FIG. 1. is a perspective view of a boat of the prior art with internal components shown using cut-out views.

FIG. 1 shows a prior art marine vehicle 100 comprising a dashboard 102. In cut-out view, the interior of the bilge 104 is visible. A fuel tank 106 and a blower 108 to ventilate fuel vapors are disposed inside the bilge 104. The inside of the fuel tank 106 is also in cut-out view which shows the fuel 110, and a float 114. The fuel tank cap 112 is visible, which is where the opening of the fuel tank is for refueling the marine vehicle. The float 114 goes up and down with the fuel level, and activates a sending unit 116. The sending unit 116 activates the fuel gauge 118 on the dashboard 102, where a needle 120 indicates the current fuel level. Also present on the dashboard is a blower switch 122 for manually activating a blower 108 for ventilating fumes out of the bilge through a vent 124.

The fuel level is therefore monitored by a fuel sensor which communicates the fuel level information to a fuel level gauge. A positive variation (increase) of the fuel level is generally related to the operation of refueling the marine vehicle, whereas an unusually rapid negative variation (decrease) of fuel level is generally related to a fuel leak. However, slight variations of fuel level may result of the movement of the fuel inside the fuel tank when the marine vehicle is moved by waves, but the fuel sensors and gauges are generally built to only record slow variations of the fuel level, in order to more reliably represent the variation of the mean fuel level, instead of having a fuel gauge needle that follows every instant movement of the fuel inside the tank.

The most commonly employed sensor for sensing the fuel level in marine vehicles has a resistive sending unit, comprising a float 114 attached to a variable resistor connected to a fuel gauge. The signal at the gauge is an electric current that varies in intensity accordingly to the change of resistance of the variable resistor. At the gauge, the electric current passes through a heating coil spun around a bimetallic strip. High intensity current results in an increased amount of heating at the coil which bends the bimetallic strip and activates the fuel gauge needle. Low intensity current reduces the heating which makes the bimetallic strip straighten and activate the fuel gauge needle in the other direction. The fuel tank probe, can either be mechanical (a float), or capacitive with an electronic conversion circuit. Usually, the resistive value of the sending unit is sent directly to an analog dial gauge on the dashboard. The dial gauge needle will rotate proportionally to the resistive value.

It will be readily understood that instead of using the fuel gauge already in place in the marine vehicle, one could install an additional fuel gauge for use with the present invention. This additional fuel gauge could be of any type and could bypass the fuel level reading of the standard fuel gauge for the purpose of the present invention.

Modern versions of fuel gauges incorporate a microprocessor that acts as an intermediary between the sending unit and the gauge. A microprocessor can either compensate for the tank shape (linearize) or provide damping so the needle does not respond to brief irrelevant movements of the float due, for example, to the movement of the marine vehicle turning or passing onto waves.

To avoid sensing small fuel variations due to regular fuel consumption or the marine vehicle passing on waves, the preferred circuitry of the signaling device of the present invention will only detect a notable variation of the fuel level, for example, a ten percent (10%) positive variation of the fuel level in the fuel tank over a certain time period. The slight variations of fuel level due to movement of the fuel inside the fuel tank generally do not exceed this value. Furthermore, negative variation of the fuel level due to fuel consumption is slower than an alarming fuel leak.

In one embodiment of the invention, the detection of a positive variation of the fuel level by the signaling device will result in activation of the blower. The fumes which are generated by the refueling operation will be ventilated and exhausted so the fume concentration in the marine vehicle will stay at a comfortable level for the marine vehicle occupants. Fumes due to a fuel leak can also be evacuated by the blower.

In another embodiment of the invention, the detection of a variation of the fuel level by the signaling device will result in the activation of an indicator for a user. The indicator may be audible and/or visual. In the case of a refueling event, the user will be informed that refueling is taking place and will know to activate the blower. In the case of a fuel leak, the user will be informed of the fuel leak and will be ready to take appropriate precautions, inspect the fuel tank, or hurry to shore.

The visual indicator can be a light indicator on the dashboard of the marine vehicle, for example a LED. The visual indicator may also be an icon displayed on a visual display on the steering wheel or on the dashboard. The audible indicator may be a "buzzer", a siren, a chime or any distinctive sound that will attract the operator's attention. In the case of a fuel leak that has drained the fuel tank, an additional indicator may be used to signal to the user that the tank is now empty due to leakage.

In other embodiments, the indicator(s) can be used concurrently with the blower activation to warn the user of the imminent activation of the blower, to indicate that the blower has already been activated, or that it is functioning properly.

In all aforementioned embodiments of the invention, a timer can advantageously be used to keep the blower active for a predetermined period of time after the refueling operation is complete (for example four minutes). This way, the blower will continue to exhaust the fumes which remain after the refueling operation is complete.

The preferred signaling device may read the fuel level value of any sending unit model. It is installed either directly on the sending unit, between the sending unit and the gauge, on the microprocessor if one is present, or directly on the gauge. The signal conversion and analysis is done directly by the signaling device.

The signaling device is preferably an electronic circuit with a microcontroller that comprises a value analysis program. For example, for a 33-240 Ω sending unit, the tank is full when the sending unit resistance is 33 Ω, whereas it is empty when the resistance reaches 240 Ω. The signaling device must determine the fuel level value according to the current that reaches it, and depending on the type of sending unit used.

It can be useful to provide an indicator signal from the blower operation area which confirms the proper functioning of the blower. This way, if there is a problem with the activation of the blower, an alert message will be displayed or an alert will be triggered for the user. The alert message may simply be the failure of a particular light display to illuminate after a predetermined period of time.

Figure 2:
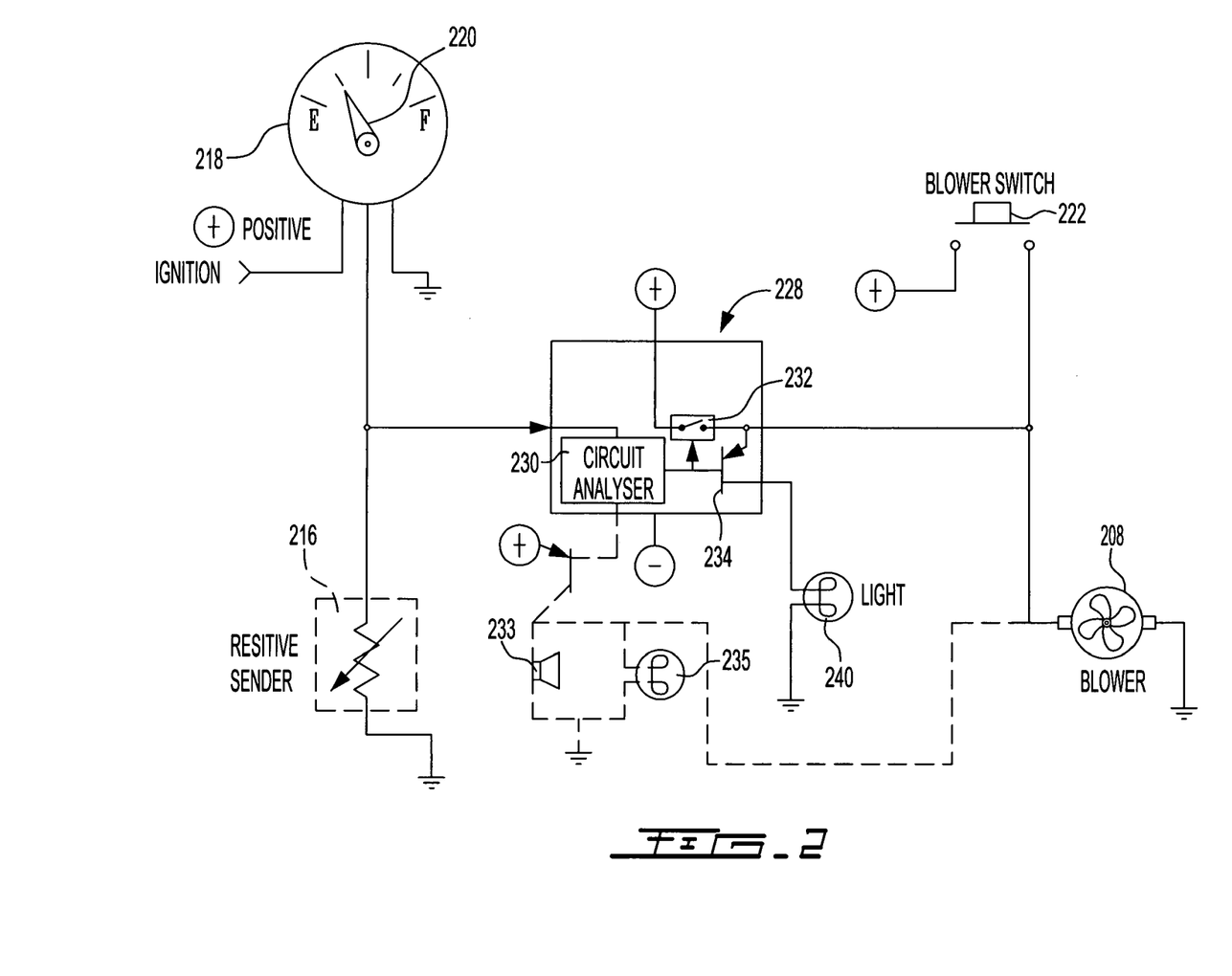
FIG. 2. is a schematic view of the circuitry of a refueling detector for a marine vehicle incorporating a signaling device and where the sending unit uses a variable resistor.

FIG. 2 shows the circuit of a blower activation and indicator activation system adapted for a resistive type sending unit. The resistive sending unit 216 is connected to a dial gauge 218.

A signaling device 228 detects the quantity of current flowing from the resistive sending unit 216 to the dial gauge 218. The signaling device 228 comprises a circuit analyzer 230, a signaling device switch 232, and a transistor 234. Once the circuit analyzer senses a refueling operation, it sends a refueling signal both to the signaling device switch 232 and to the transistor 234. Please note that the signaling device switch 232 may be replaced by a transistor, as will be readily understood by one skilled in the art.

A blower switch 222 is connected to a blower 208. By activating the blower switch 222, a user will activate the blower 208. The signaling device 228, more particularly the signaling device switch 232 incorporated therein, is also connected to the blower 208.

Furthermore, the signaling device switch 232 is also connected to an indicator 240 via the transistor 234. The indicator 240 may be any indicator that may attract the attention of the user. It may be a visual indicator like a light display on the dashboard, or an audible signal like a chime emitted near the marine vehicle user.

The circuit configuration of FIG. 2 for use with a resistive sending unit 216 incorporates both the embodiments of the indicator activation, and the blower activation. When only the blower 208 is to be triggered, the transistor 234 and indicator 240 are eliminated, whereas when the embodiment should only trigger an indicator, the wire connecting the signaling device switch 232 to the blower 208 is eliminated.

An optional embodiment connects the circuit analyzer in a way to trigger an audible fuel leakage indicator 233, a visual fuel leakage indicator 235 and/or activate the blower 208 in the eventuality of fuel leakage. This connection is shown in dashed lines.

Figure 3:
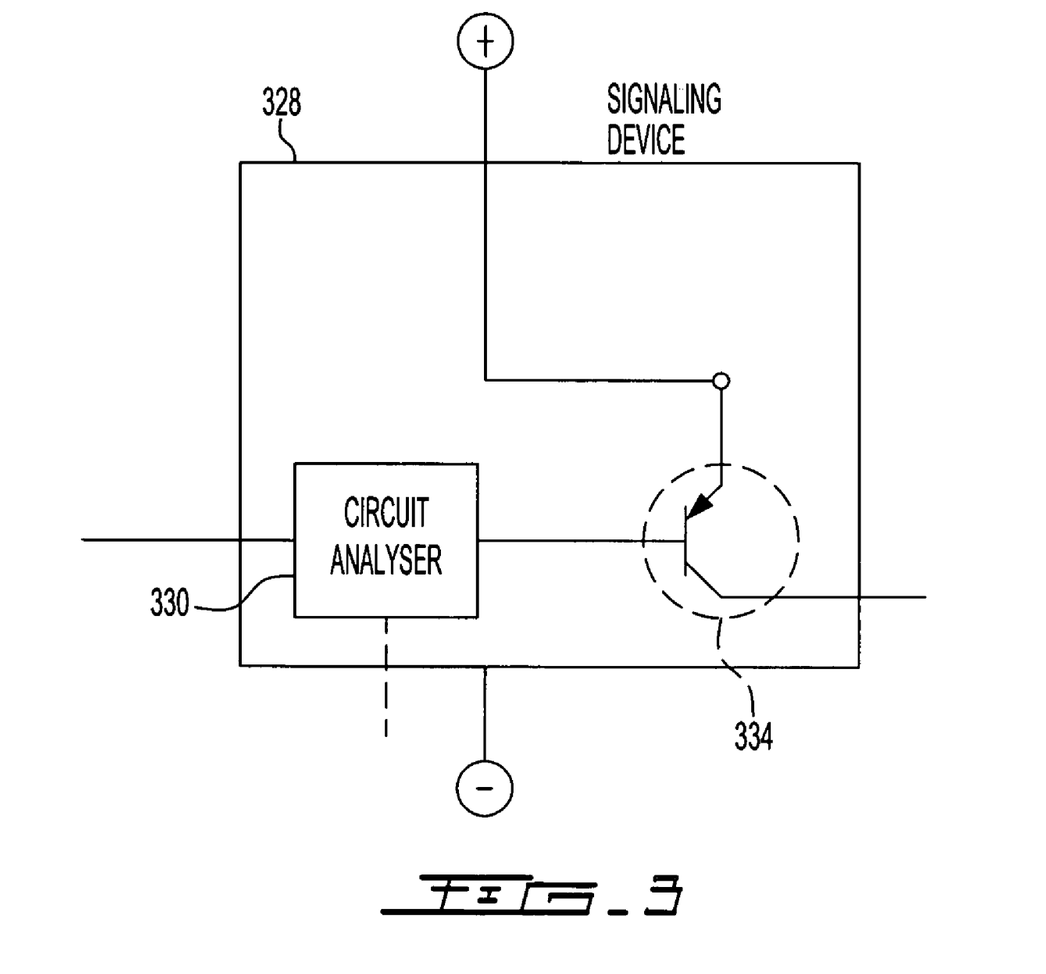
FIG. 3. is a schematic view of the circuit of an alternative to the signaling device of FIG. 2.

FIG. 3 shows an alternative embodiment 328 of the signaling device 228 where only one transistor 334 is used to replace both the signal switch 232 and the transistor 234 illustrated in FIG. 2. The refueling signal will activate the transistor which will allow current to pass through to a refueling indicator 240, and/or to a blower 208. The use of only one transistor has the advantage to simplify the circuitry.

Figure 4:
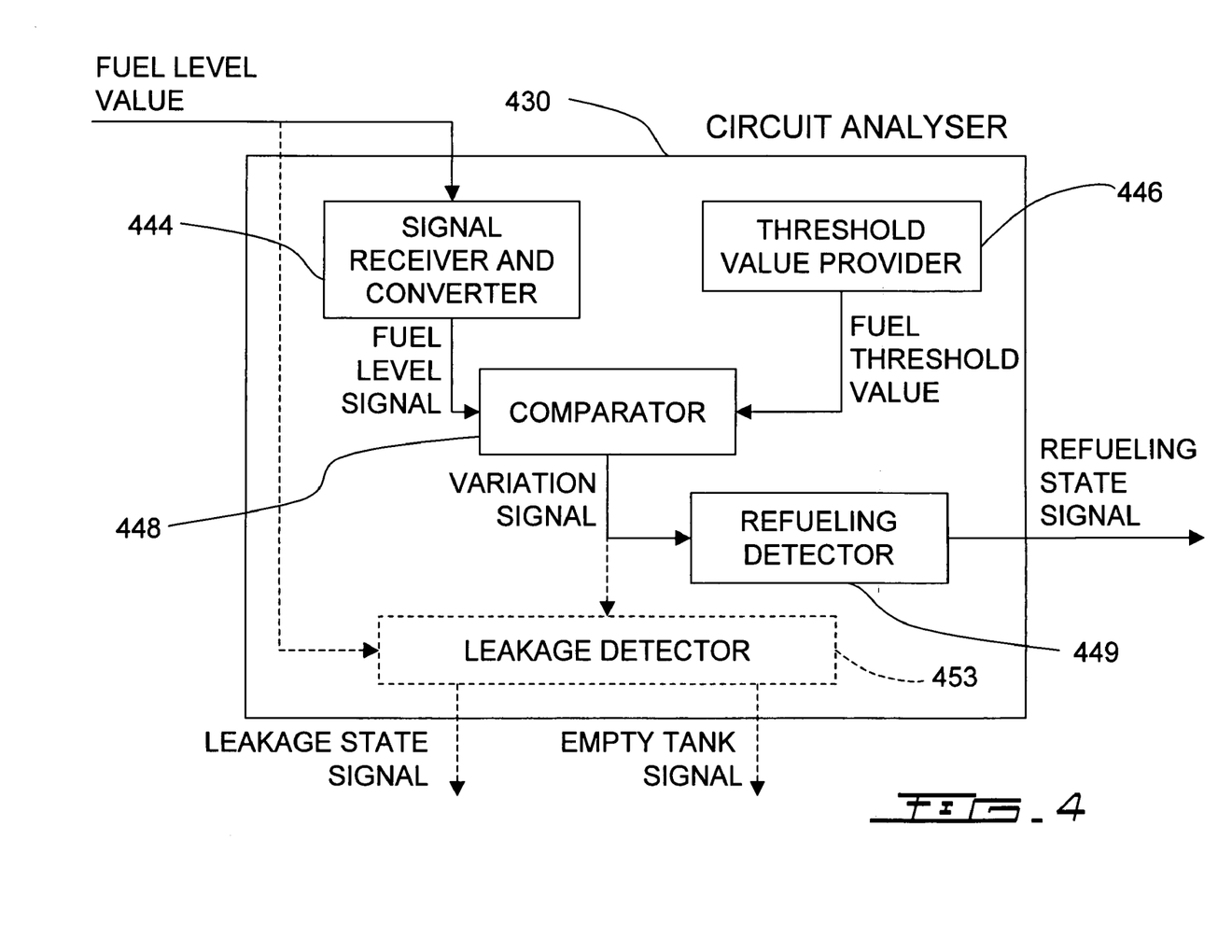
FIG. 4 is a block diagram illustrating the components of the circuit analyzer present in FIGS. 2 and 3.

FIG. 4 illustrates a block diagram of the preferred components to be used in the circuit analyzer 430. The fuel level value coming from the sending unit is received by a signal receiver 444, the signal receiver transforms the fuel level value to a fuel level signal using the variation of the fuel level value detected over a period of time, and sends the fuel level signal to a comparator 448. Positive and/or negative variation threshold values are provided to the comparator 448 by a threshold value provider 446. This threshold value corresponds to the minimum value of fuel variation for which a blower and/or indicator activation is desired. For example, the threshold value might correspond to a fuel level variation of 10% of the fuel tank capacity over a relatively short period of time. The threshold value is sent to the comparator 448. The comparator 448 compares the fuel level signal to the fuel threshold value. The comparator 448 generates a fuel level variation signal. In applications where no threshold value is to be used, the stored threshold value is simply zero, or the comparison is not made because there is no threshold value provider.

A positive fuel variation signal corresponds to a refueling of the marine vehicle and is then detected by a refueling detector 449 that generates a refueling state signal.

Optionally, a negative fuel variation due to an alarming rate of fuel level decrease is detected by a leakage detector 453. The leakage detector 453 generates a fuel leakage signal. The leakage detector 453 can additionally detect the fuel level value, and emit an empty tank signal when the negative variation signal is interrupted and the fuel level is detected to be nil.

The signal receiver and converter 444, the comparator 448 and the threshold value provider 446 each may comprise sets of stored data corresponding to different types of sending units. In this case, the right model of sending unit will preferably be selected and programmed into the appropriate component(s) of the circuit analyzer at installation, and the signaling device will need no adjustment thereafter.

In the optional embodiment of the invention relating to detecting a negative fuel level value variation corresponding to fuel leakage, the leakage signal may be used to activate a fuel leakage indicator (233, 235) and/or a blower (208). The fuel leakage indicator (233, 235) indicates to a user that there is an alarming rate of fuel level decrease. The leakage detector 453 may also receive the fuel level value, as shown, and generate an empty fuel tank signal to activate an empty tank indicator upon detecting that the variation signal has become nil and the fuel level value is also nil due to a complete leakage of the fuel.

Figure 5:
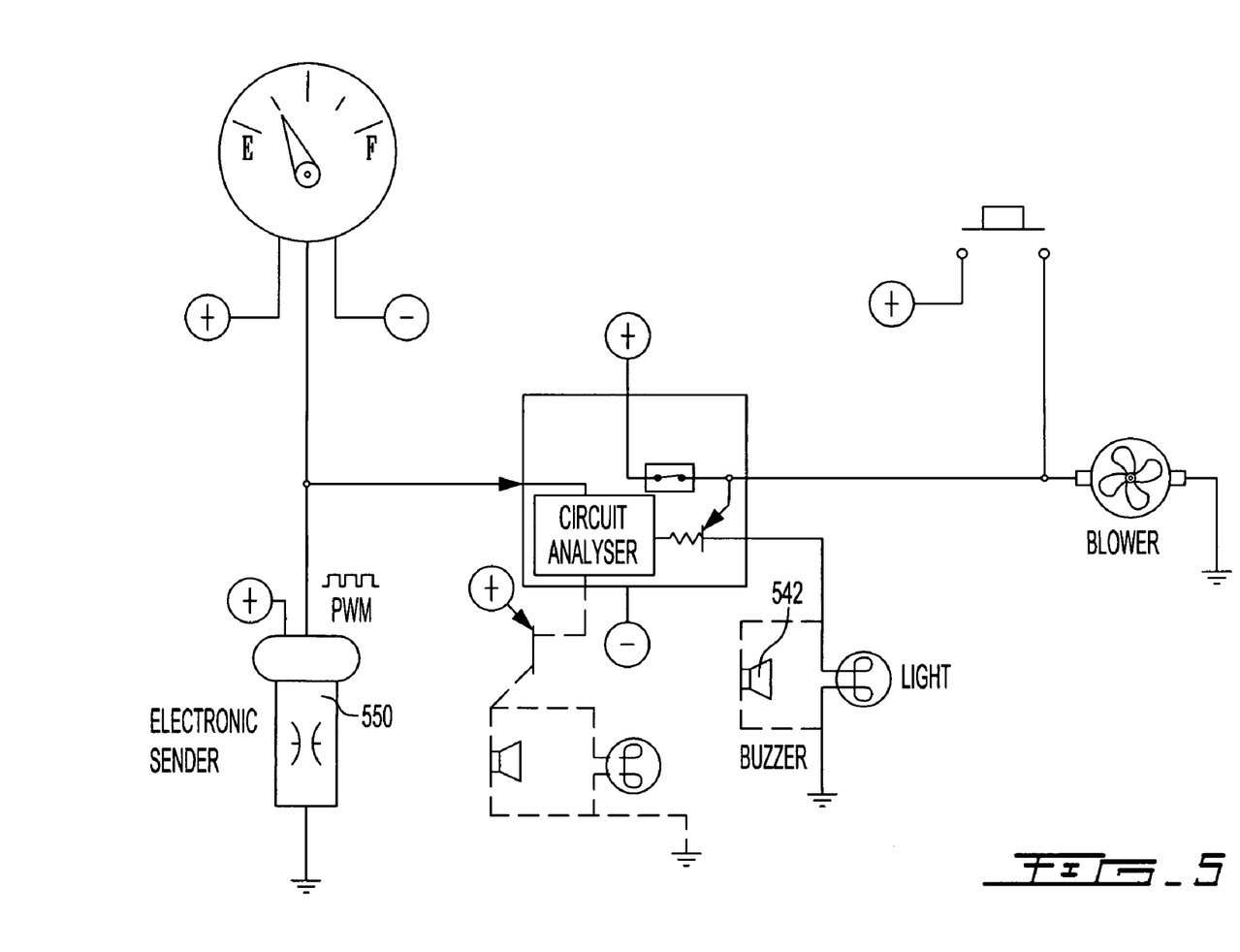
FIG. 5 is a schematic view of the circuitry of a refueling detector for marine vehicle where the sending unit is an electronic sending unit.

FIG. 5 illustrates a schematic circuitry for a indicator activation and blower activation system similar to the one of FIG. 2, but wherein an electronic sending unit 550 that uses a Pulse Width Modulator (PWM) is used instead of a resistive sending unit 216. The audible indicator 542, an alternative to the visual indicator, is also illustrated in dashed lines.

Figure 6:
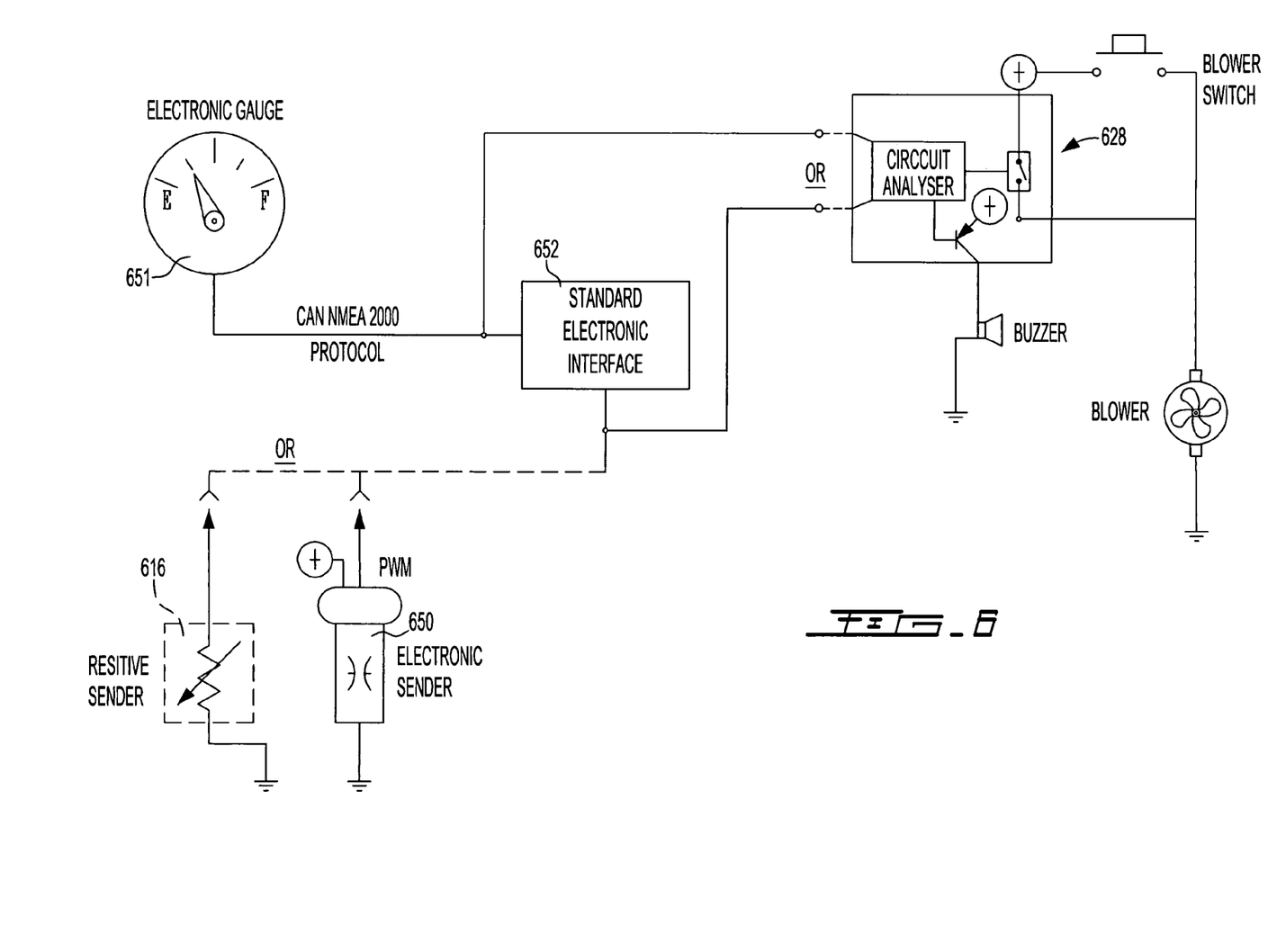
FIG. 6 is a schematic view of the circuitry of a refueling detector using either a resistive or an electronic sending unit configured as per the National Marine Electronics Association (NMEA) 2000 Protocol.

FIG. 6 illustrates a configuration as per the National Marine Electronics Association 2000 Protocol. The sending unit may be either resistive 616 or electronic 650, and is connected to an electronic gauge 651 via a standard electronic interface 652. The signaling device 628 may either be connected between the standard electronic interface 652 and the electronic fuel gauge 651, or between the sending unit (616 or 650) and the standard electronic interface 652. The detail and functioning of the signaling device in this configuration is essentially the same as in the configurations illustrated in FIGS. 2 and 5.

Figure 7:
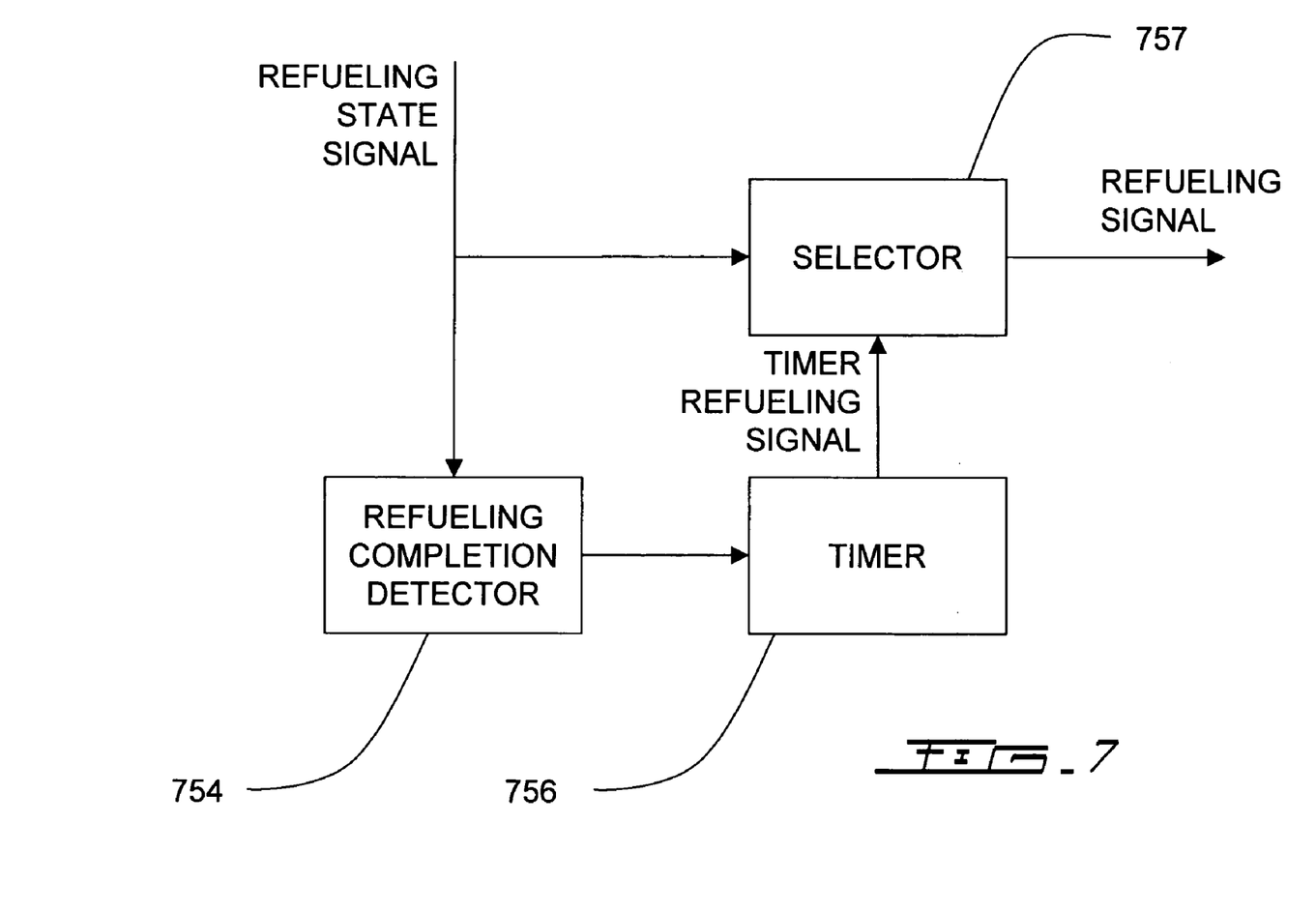
FIG. 7 is a block diagram of the optional embodiment of the signaling device using a timer.

FIG. 7 illustrates an optional embodiment of the invention wherein a timer 756 is incorporated. The refueling state signal indicates that refueling is actually taking place and that the fuel level in the fuel tank is increasing. The refueling state signal is sent both to a refueling completion detector 754, and to a selector 757. The selector transforms the refueling state signal to a refueling signal which used thereafter as shown in FIGS. 2, 5 and 6. If no timer is used, the refueling state signal is equivalent to the refueling signal.

The refueling completion detector 754, however, has the function of detecting the end of the refueling event. When the refueling operation stops, the fuel level value stops varying accordingly, and the refueling state signal is interrupted. The refueling completion detector detects the end of the refueling state signal and triggers the activation of the timer 756.

The timer 756 will stay active for a predetermined amount of time, for example four minutes. During the time the timer 756 is active, the timer 756 will generate a timer refueling signal which indicates that a predetermined delay has not expired since the refueling has taken place, and that it is still wanted that the blower remain active to ventilate remaining fumes. The timer refueling signal is fed to the selector 757 which transforms the timer refueling signal into the refueling signal.

The function of the selector 757 is to detect either the refueling state signal or the timer refueling signal, and to responsively emit a refueling signal. The refueling signal being used to activate the indicator(s), or to activate the blower.

Figure 8A:
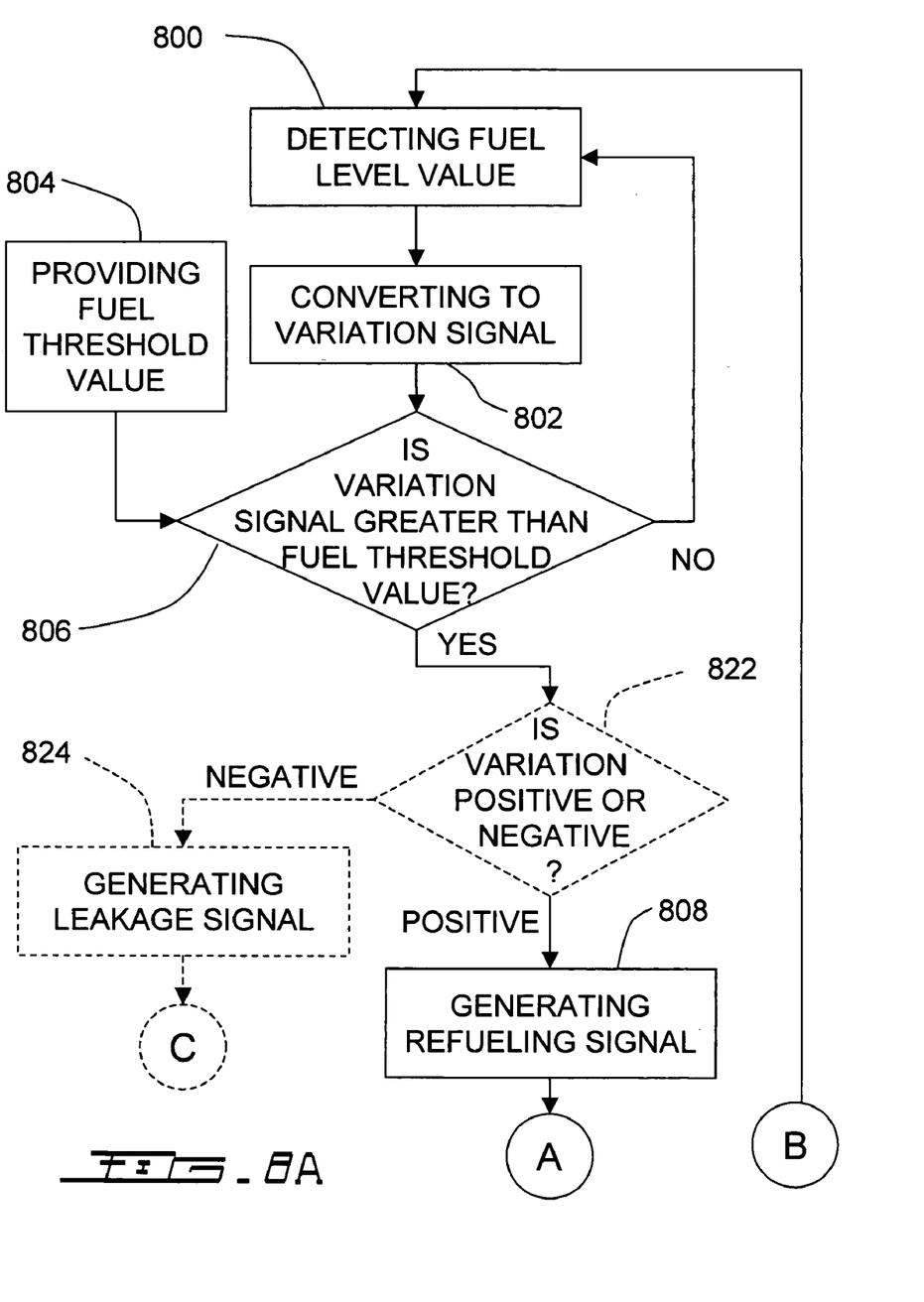
Figure 8B:
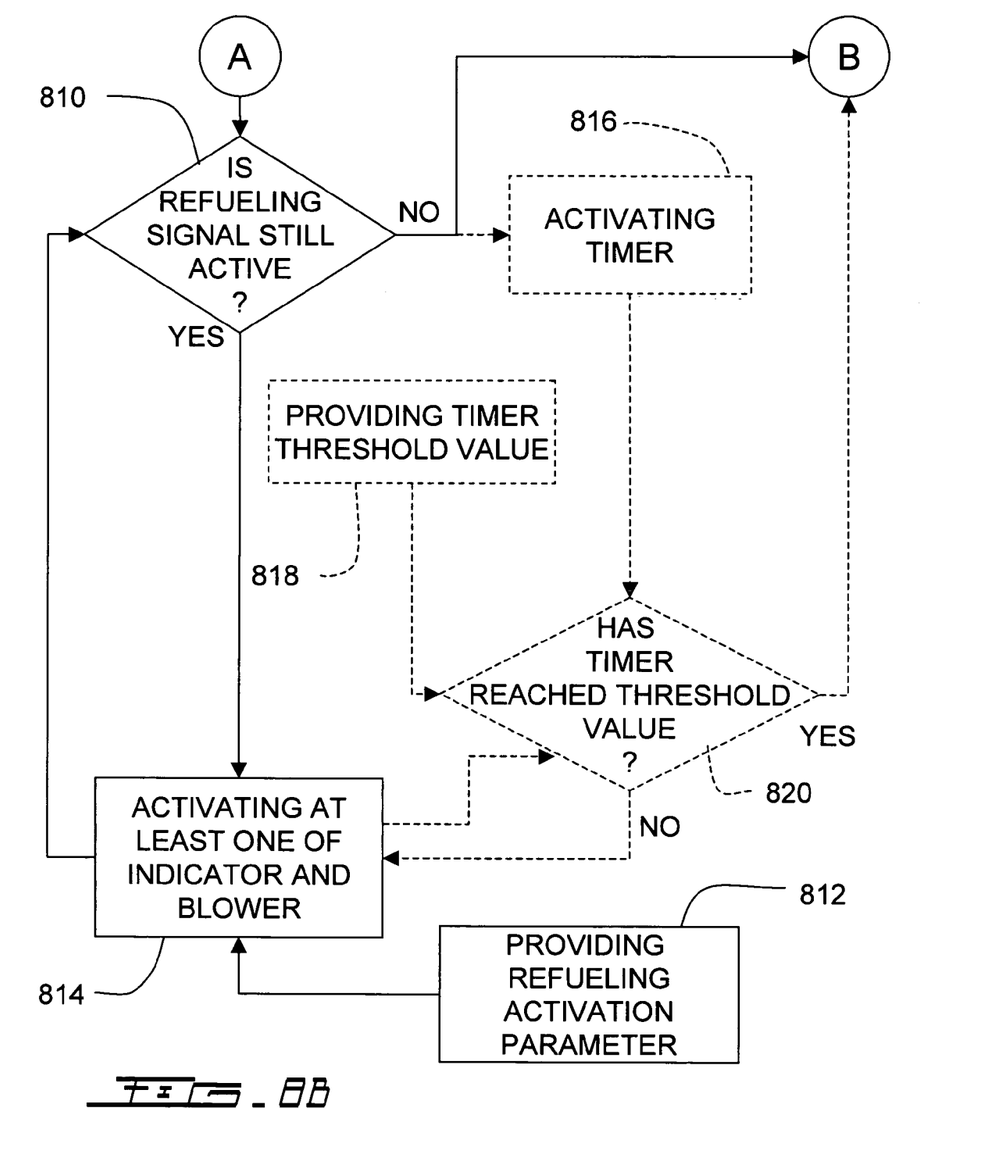

FIGS. 8A and 8B illustrate a flowchart of the steps for the activation of an indicator and/or blower upon detection of a refueling event. The first step is to detect an input signal 800 which is actually a fuel level value which is generated by a fuel sensor. The fuel level value is converted 802 to a variation signal. The variation signal represents the variation of the fuel level value over a period of time. For example, during the refueling, the fuel level will increase over a period of time, and the variation signal will represent the total increase that has taken place over the period of time.

Since the fuel level may vary slightly due to the movement of the marine vehicle over the waves, it may be found useful to provide a non-zero threshold value which will be the minimal value at which the variation signal will be sufficient to go further in the algorithm. Thus, a fuel variation threshold value is provided 804, which may represent for example 10 percent of the total fuel tank volume. If the variation signal is greater than 806 the provided fuel threshold value, a refueling signal is generated 808. If the variation signal is lesser than 806 the fuel threshold value, the fuel level value continues to be detected 800 and converted to a fuel variation signal 802 until the fuel variation signal is found to be greater than the fuel threshold value.

Continuing on FIG. 8B, when the fuel variation signal is found to be greater than the fuel threshold value, a refueling signal is generated 808. The refueling signal remains active until the end of refueling. For as long as the refueling signal remains active 810, activation is made 814 of at least one of an indicator and a blower, according to a provided 812 activation parameter. The indicator can be visual or audible.

When the refueling signal stops 810, the detection of the input signal 800, its conversion 802 to fuel variation signal, and its comparison 806 to the fuel level threshold value 804 begins anew, until the next fuel level value variation event.

The optional embodiment of the invention where a timer is used is indicated on FIG. 8B. Upon detection of the absence of the refueling signal 810, a timer is activated 816, and a timer threshold value is provided 818. For as long as the timer has not reached 820 the timer threshold value, the activation according to the provided 812 activation parameter will continue 814 taking place, similarly to how it takes place when the refueling signal is active. However, when the timer has reached the threshold value 820, the activation 814 stops and the algorithm starts over until the next variation event.

Figure 8C:
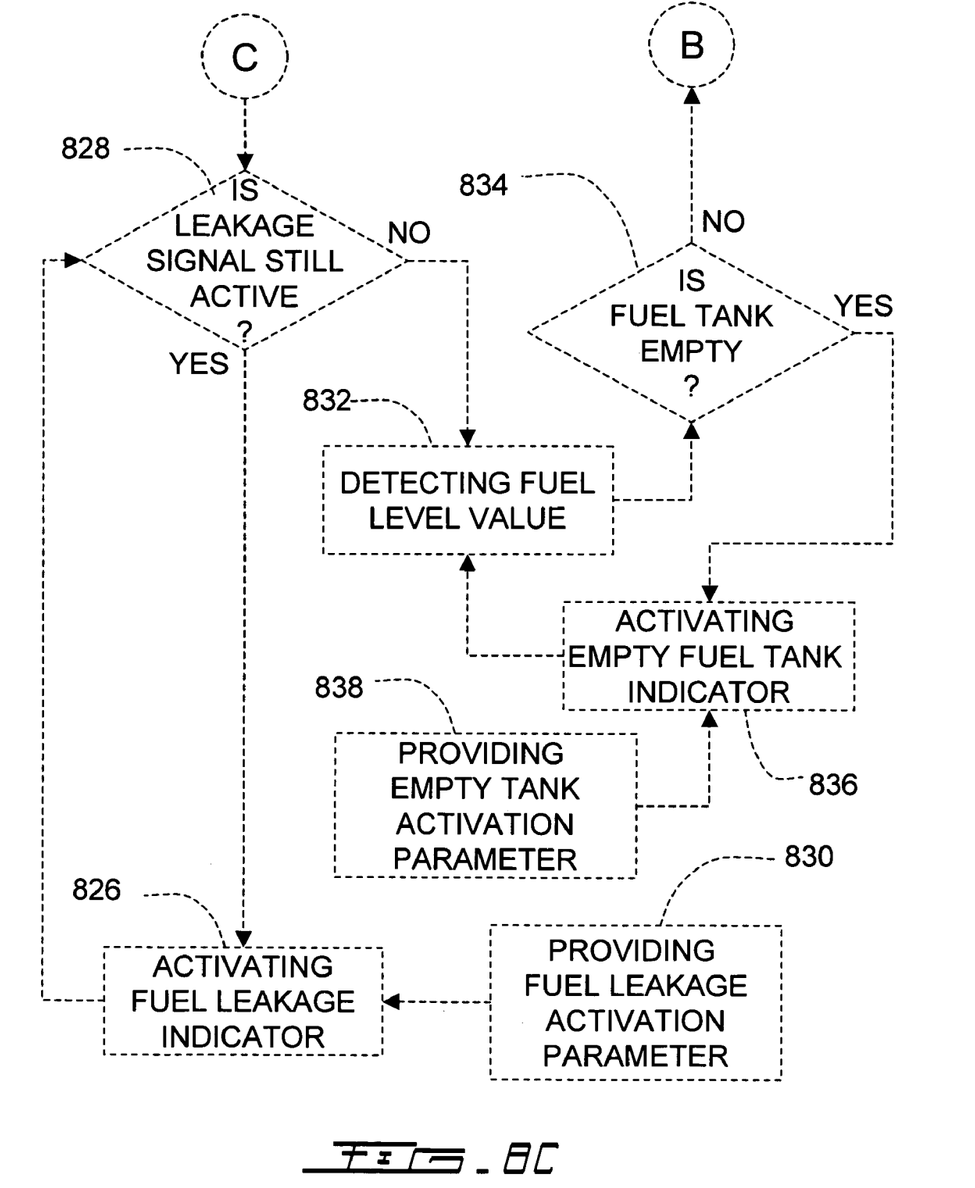

Now considering FIGS. 8A and 8C, the optional embodiment of a negative fuel variation due to a fuel leak is detailed. In this embodiment, the conversion 802 of the detected 800 fuel level value may provide either a positive or negative fuel variation signal. Accordingly, a different threshold value may be provided 804 for a negative fuel variation value than the threshold value for the positive fuel variation signal. If the absolute value of the negative fuel variation signal is greater than 806 the absolute value of the negative fuel threshold value, sufficient negative fuel variation is detected. When the fuel variation is negative 822, a fuel leakage signal is generated 824 and remains active as long as the comparison 806 yields a "YES" answer. The fuel leakage signal is used to activate 826 a fuel leakage indicator and/or a blower, according to a fuel leakage activation parameter provided 830. When the leakage signal stops, the algorithm starts over whereby if the user repairs the boat leak and refuels the boat, the system will function properly.

A further option of the system is to provide an indicator to indicate to a user when the tank has become empty due to a fuel leak. When the fuel leakage signal is detected 828 to be absent, the fuel level value is detected 832. If the fuel level value corresponds 834 to an empty fuel tank, an empty fuel tank indicator for the user is activated 836 according to provided activation parameters 838. Once the fuel level is detected 832 not to be empty anymore 834, the algorithm starts over. If the fuel tank is refueled before becoming empty or the fuel leak is stopped before the tank becomes empty, the empty fuel tank indicator is not activated.

The embodiments of the invention described above are intended to be exemplary only. The scope of the invention is therefore intended to be limited solely by the scope of the appended claims.

What is claimed is:

1. A signaling device for a marine vehicle having a fuel tank, a fuel level value corresponding to a fuel level detected in the fuel tank, and a blower to evacuate fuel fumes, said signaling device comprising:
    a fuel level variation detector for detecting a variation of the fuel level value over time;
    a refueling detector for detecting a fuel level increase in said variation to correspond to a refueling event;
    a refueling signal generator for generating a refueling signal when said refueling event is detected; and
    a refueling activator for activating at least one of said blower and an indicator of said refueling for said user, using said refueling signal.

2. The signaling device of claim 1 wherein the indicator is a visual indicator and is at least one of a LED, a light, and a visual icon on a display.

3. The signaling device of claim 1 wherein the indicator is an audible indicator generated by a sound producing device, said audible indicator is at least one of a chime, a buzzer, and a siren.

4. The signaling device of claim 1 further comprising:
    a threshold provider for providing a fuel level positive variation threshold value; and wherein
    said refueling signal generator generates said refueling signal only when said variation is greater than said threshold value.

5. The signaling device of claim 4 wherein said fuel tank has a fuel tank volume, and wherein said threshold value is 10% of said fuel tank volume.

6. The signaling device of claim 1 further comprising:
    a timer for triggering said refueling signal generator to generate said refueling signal for a predetermined amount of time after said refueling event has been detected as ended by said refueling signal detector.

7. The signaling device of claim 6 wherein said predetermined amount of time is four minutes.

8. The signaling device of claim 1 further comprising:
    a fuel usage provider for providing an expected fuel usage over time for said marine vehicle;
    a leakage detector for detecting a fuel level decrease greater than said expected fuel usage in said variation to correspond to a leakage event;
    a leakage generator for generating a leakage signal when said leakage event is detected; and
    a leakage activator for activating a leakage indicator for said user using said leakage signal.

9. The signaling device of claim 8 further comprising:
an empty tank detector for obtaining, after said leakage event is detected to be ended by said leakage generator, said fuel level value; and
an empty tank activator for activating an empty tank indicator for said user after said fuel level value is detected by said empty tank detector to be nil.

10. A signaling method for a marine vehicle having a fuel tank, a fuel level value corresponding to a fuel level detected in the fuel tank, and a blower to evacuate fuel fumes, said signaling method comprising:
detecting a variation of the fuel level value over time;
detecting a fuel level increase in said variation to correspond to a refueling event;
generating a refueling signal when said refueling event is detected; and
activating at least one of said blower and an indicator of said refueling for said user, using said refueling signal.

11. The signaling method of claim 10, further comprising:
providing a fuel level positive variation threshold value; and
wherein said generating said refueling signal is only carried out when said variation is greater than said threshold value.

12. The signaling method of claim 11 wherein said fuel tank has a fuel tank volume, and wherein said threshold value is 10% of said fuel tank volume.

13. The signaling method of claim 10 further comprising:
triggering said refueling signal generator to generate said refueling signal for a predetermined amount of time after said refueling event has been detected as ended.

14. The signaling method of claim 13 wherein said predetermined amount of time is four minutes.

15. The signaling method of claim 10 further comprising:
providing an expected fuel usage over time for said marine vehicle;
detecting a fuel level decrease greater than said expected fuel usage in said variation to correspond to a leakage event;
generating a leakage signal when said leakage event is detected; and
activating a leakage indicator for said user using said leakage signal.

16. The signaling method of claim 15 further comprising:
obtaining, after said leakage event is detected to be ended, said fuel level value; and
activating an empty tank indicator for said user after said fuel level value is detected to be nil.

* * * * *